F. ARBEY.
LATHE FOR TURNING IRREGULAR BODIES.
No. 186,701. Patented Jan. 30, 1877.
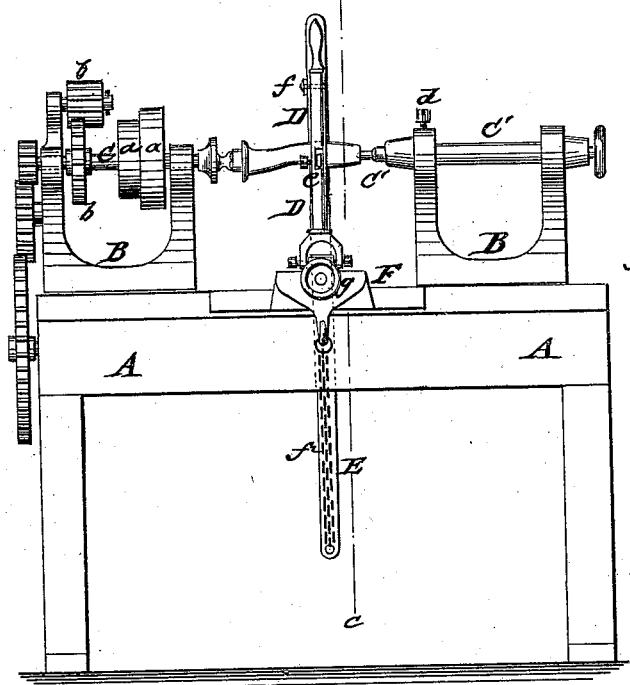
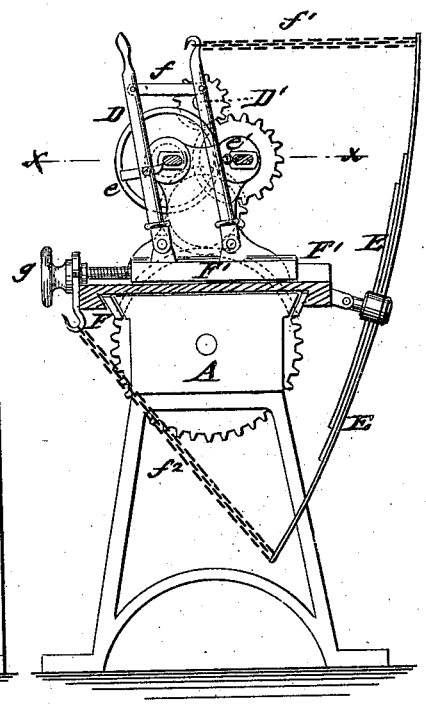
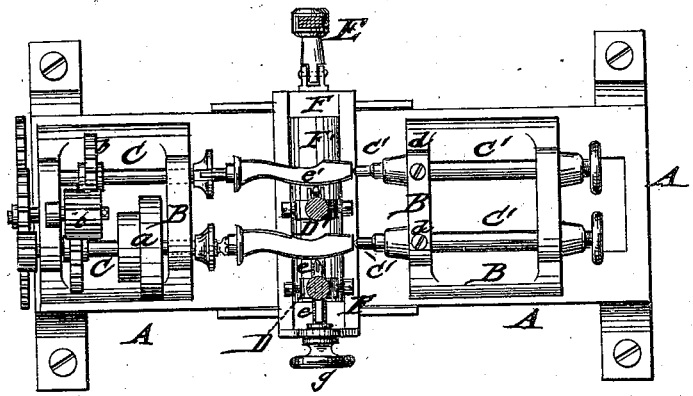
WITNESSES:
INVENTOR:
F. Arbey
BY
ATTORNEYS.

UNITED STATES PATENT OFFICE.

FERDINAND ARBEY, OF PARIS, FRANCE.

IMPROVEMENT IN LATHES FOR TURNING IRREGULAR BODIES.

Specification forming part of Letters Patent No. 186,701, dated January 30, 1877; application filed November 25, 1876.

*To all whom it may concern:*

Be it known that I, FERDINAND ARBEY, of Paris, France, have invented an Improvement in Lathes for Turning Irregular Bodies, of which the following is a specification:

In the accompanying drawing, Figure 1 represents a front elevation; Fig. 2, a vertical transverse section on line $c\ c$, Fig. 1; and Fig. 3, a top view, partly in horizontal section, on line $x\ x$, Fig. 2, of my improved lathe for turning irregular bodies.

Similar letters of reference indicate corresponding parts.

This invention has reference to a lathe by which sword-handles and other bodies of irregular shape may be turned or carved in perfectly reliable and automatic manner.

The invention will first be described in connection with the drawing, and then pointed out in the claim.

Referring to the drawing, A represents the supporting-frame of the lathe, which carries, in suitable standards B, the rotating mandrels C and the fixed centers C'. One of the mandrels C carries a set of cone-pulleys, $a$, to which the power is applied from the driving-shaft, and transmitted by intermeshing gearing $b$ to the second mandrel C, and by end gearings to a screw-shaft below the table of frame A.

The fixed lathe-centers C' are adjustable to the work by end threads and handles, and secured by set-screws $d$, so as to hold, in connection with the heads of the mandrels, the model that is to be copied from, and the piece of wood or blank that is to be turned. These bodies are shown in the drawing as mounted on the lathe. The turning of the sword-handle, gun-stock, or other body is accomplished by a V-shaped cutter, $e$, that is secured to a pivoted lever, D, which is jointed, by a connected pivot-link, $f$, to a second pivoted lever, D', that swings by means of the connecting-link in parallelism with the first lever, and transversely to the longitudinal axis of the lathe.

A handle at the upper end of lever D admits the ready taking off of the cutter from the wood at any moment, while a chain, $f^1$, that connects the end of the second lever D' with a strong leaf-spring, E, pivoted by a center socket to carriage F, presses the cutting-tool against the blank to be turned, and also a blunt guide-tool, $e'$, against the handle or other model of irregular shape that is to be copied.

The lower end of the leaf-spring E is connected, for balancing its power, by a chain, $f^2$, to a hook at the front part of the carriage F.

The pivot-levers D D' are applied to a laterally-adjustable part, F', of carriage F, which part is guided in rails of the same, and set to the work by a screw, $g$. The carriage F is moved along side guides of the table of frame A by connection with the revolving screw-shaft, so as to travel automatically in forward and backward direction. The carriage may also be moved by suitable lever mechanism along the table, for setting the cutter and guide-tool to the work. The joint motion of the cutter-tool, produced in longitudinal direction by the traveling carriage, and in lateral direction by the power of the spring that presses the guide and cutting tools against the bodies, accomplishes the exact copying or reproducing of the shape of the finished body by cutting out the simultaneously-revolving blank in corresponding shape until finished, when a new piece is inserted and cut out in similar manner, and so on, the bodies being thus turned on the lathe in rapid and reliable manner.

Any body of irregular outline, and its peculiar features, may be turned and carved on the lathe, which may thus be employed for a variety of purposes, in advantageous and economical manner.

Having thus described my invention, I claim as new and desire to secure by Letters Patent—

1. The combination of the parallel swinging and jointed pivot-levers D D', carrying, respectively, a cutting and guiding tool, with a balanced leaf-spring, E, of the cutter-carriage, substantially as and for the purpose described.

2. The combination of the longitudinally-traveling and laterally-adjustable carriage F with the parallel, swinging, jointed, and spring-acted pivot-levers D D', carrying the cutting and guiding tools, substantially as and for the purpose specified.

FERDINAND ARBEY.

Witnesses:
 PAUL GOEPEL,
 EUGÈNE L. TOURET.